US012627427B2

(12) United States Patent
Liang et al.

(10) Patent No.: US 12,627,427 B2
(45) Date of Patent: May 12, 2026

(54) METHOD FOR HARQ TRANSMISSION

(71) Applicant: ZTE Corporation, Shenzhen (CN)

(72) Inventors: Chulong Liang, Shenzhen (CN); Jin Xu, Shenzhen (CN); Liguang Li, Shenzhen (CN); Qiang Fu, Shenzhen (CN); Jian Kang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 707 days.

(21) Appl. No.: 17/854,876

(22) Filed: Jun. 30, 2022

(65) Prior Publication Data

US 2022/0345262 A1     Oct. 27, 2022

Related U.S. Application Data

(63) Continuation of application No. PCT/CN2020/084138, filed on Apr. 10, 2020.

(51) Int. Cl.
| | |
|---|---|
| *H04L 1/1812* | (2023.01) |
| *H04L 1/1607* | (2023.01) |
| *H04L 1/1829* | (2023.01) |
| *H04L 1/20* | (2006.01) |
| *H04L 5/00* | (2006.01) |

(52) U.S. Cl.
CPC .......... *H04L 5/0044* (2013.01); *H04L 1/1671* (2013.01); *H04L 1/1812* (2013.01); *H04L 1/1864* (2013.01); *H04L 1/203* (2013.01); *H04L 5/0053* (2013.01)

(58) Field of Classification Search
CPC ... H04L 5/0044; H04L 1/1671; H04L 1/1812;
H04L 1/1864; H04L 1/203; H04L 5/0053;
H04L 1/0005; H04L 1/0011; H04L
1/0026; H04L 1/0025; H04L 1/1819;
(Continued)

(56) References Cited

U.S. PATENT DOCUMENTS

| | | |
|---|---|---|
| 2005/0213543 A1 | 9/2005 | Shimizu et al. |
| 2005/0281212 A1 | 12/2005 | Jeong et al. |

(Continued)

FOREIGN PATENT DOCUMENTS

| | | |
|---|---|---|
| CN | 106160987 A | 11/2016 |
| CN | 107222298 A | 9/2017 |

(Continued)

OTHER PUBLICATIONS

Qualcomm, "Updated consolidated parameter list for Rel-16 NR", R1-2001478 Feb. 24, 2020, 56 pages; available at http://www.3gpp.org/ftp/TSG_RAN/WG1_RL1/TSGR1_100_e/Docs/R1-2001478.zip.

(Continued)

*Primary Examiner* — Edan Orgad
*Assistant Examiner* — Malick A Sohrab
(74) *Attorney, Agent, or Firm* — Crowell & Moring LLP

(57) ABSTRACT

This document generally relates to transmitting a feedback message from a first node to a second node, where the message indicates both a detection result of receiving at least a portion of a transport block, and addition information that indicates to the second node how to set one or more parameters for a subsequent transmission. In various embodiments, the message includes a value, such as an M-bit binary value that indicates both the detection result and the additional information.

20 Claims, 3 Drawing Sheets

400

402 — Second node transmits at least one transport block portion to a first node 404 — Second node receives a message associated with the at least one transport block portion 406 — Second node sets one or more parameters for a subsequent transmission according to the message 408 — Second node performs a subsequent transmission according to the set parameter(s)

(58) Field of Classification Search
CPC ... H04L 1/1825; H04L 1/1893; H04L 1/1642; H04L 1/0003; H04L 1/0061; H04L 1/0071

See application file for complete search history.

(56) References Cited

U.S. PATENT DOCUMENTS

| | | | |
|---|---|---|---|
| 2006/0176856 A1 | 8/2006 | Yang et al. | |
| 2007/0238462 A1* | 10/2007 | Pedersen | H04L 1/0026 |
| | | | 370/473 |
| 2009/0013232 A1* | 1/2009 | Wan | H04L 1/1854 |
| | | | 714/748 |
| 2011/0222483 A1 | 9/2011 | Yuda et al. | |
| 2016/0261321 A1* | 9/2016 | Andgart | H04L 1/0003 |
| 2017/0141903 A1 | 5/2017 | Xu et al. | |
| 2018/0317213 A1* | 11/2018 | Islam | H04L 1/1614 |
| 2019/0394793 A1* | 12/2019 | Venugopal | H04L 1/1825 |
| 2020/0059327 A1* | 2/2020 | Kini | H04L 1/1812 |
| 2020/0099474 A1* | 3/2020 | Wikström | H04L 1/0068 |
| 2020/0221456 A1* | 7/2020 | Kwak | H04L 5/0053 |
| 2023/0028029 A1* | 1/2023 | Cui | H04L 1/1819 |

FOREIGN PATENT DOCUMENTS

| | | |
|---|---|---|
| CN | 108347295 A | 7/2018 |
| CN | 108631951 A | 10/2018 |
| CN | 109005007 A | 12/2018 |
| CN | 106385309 B | 1/2020 |
| EP | 1 580 918 A2 | 9/2005 |
| EP | 3 139 529 A1 | 3/2017 |
| JP | 2005-277570 A | 10/2005 |
| JP | 2006-191279 A | 7/2006 |
| JP | 2010-536278 A | 11/2010 |
| JP | 2018-191118 A | 11/2018 |
| WO | WO 2009/022468 A1 | 2/2009 |
| WO | WO 2019/148318 A1 | 8/2019 |

OTHER PUBLICATIONS

Huawei, "*Feature lead summary of email discussion 100e-NR-unlic-NRUHARQandULscheduling-03 (multi-PUSCH scheduling with DCI 0_1)*", 3GPP TSG RAN WG1 Meeting #100-e, R1-2001270, Feb. 24, 2020 (8 pages).
Huawei, "*Feature lead summary#2 on NR-U HARQ and multi-PUSCH scheduling*", 3GPP TSG RAN WG1 Meeting #100-e, R1-2001191, Feb. 24, 2020 (26 pages).
Huawei, "*Feature lead summary#1 on NR-U HARQ and multi-PUSCH scheduling*", 3GPP TSG RAN WG1 Meeting #100-e, R1-2001043, Feb. 24, 2020 (5 pages).
Google Inc., "*Remaining issues on NR-U HARQ procedures*", 3GPP TSG-RAN-WG1 Meeting #100, R1-2001000, Feb. 24, 2020 (7 pages).
Sharp, "*Remaining issues and corrections on HARQ enhancement for NRU*" 3GPP TSG RAN WG1 #100, R1-2000874, Feb. 24, 2020, (9 pages).
LG Electronics, "*Remaining issues of HARQ procedure for NR-U*", 3GPP TSG RAN WG1 #100, R1-2000665, Feb. 24, 2020, (10 pages).
Samsung, "*HARQ enhancements for NR-U*", 3GPP TSG RAN WG1 #100, R1-2000612, Feb. 24, 2020 (15 pages).
Lenovo, Motorola Mobility, "*Text proposals for HARQ enhancement for NR-U*", 3GPP TSG RAN WG1 #100, R1-2000592, Feb. 24, 2020 (9 pages).
Nokia, Nokia Shanghai Bell, "*Remaining issues on NR-U HARQ scheduling and feedback*", 3GPP TSG RAN WG1 Meeting #100e, R1-2000503, Feb. 24, 2020 (12 pages).
OPPO, "*Remaining issues on HARQ enhancements for NR-U*", 3GPP TSG RAN WG1 #100-E, R1-2000472, Feb. 24, 2020, (12 pages).

Qualcomm, "*Updated consolidated parameter list for Rel-16 NR*", R1-1913674 Nov. 18, 2019, 46 pages, available at http://www.3gpp.org/ftp/TSG RAN/WG1_RL1/TSGR1_99/Docs/R1-1913674.zip.
Qualcomm Incorporated, "*Summary of NR-U agreements till RAN1 #99*", 3GPP TSG RAN WG1 Meeting #99, R1-1913599, Nov. 18, 2019 (40 pages).
Qualcomm, "*Consolidated porameter list for Rel-16 NR RAN1 99 Day5*", R1-1913563, November 18, 2022, 38 pages, available at http://www.3gpp.org/ftp/TSG_RAN/WG1_RL1/TSGR1_99/Docs/R1-1913563.zip.
Qualcomm, "*Consolidated porameter list for Rel-16 NR RAN1 99 Day4*", R1-1913555, Nov. 18, 2022, 36 pages, available at http://www.3gpp.org/ftp/TSG_RAN/WG1_RL1/TSGR1_99/Docs/R1-1913555.zip.
Huawei, "*Feature lead summary#3 of HARQ enhancements for NR-U*", 3GPP TSG RAN WG1 Meeting #99, R1-1913561, Nov. 18, 2019 (41 pages).
Huawei, "*Feature lead summary#2 of HARQ enhancements for NR-U*", 3GPP TSG RAN WG1 Meeting #99, R1-1913418, Nov. 18, 2019 (43 pages).
Huawei, "*Feature lead summary#1 of HARQ enhancements for NR-U*", 3GPP TSG RAN WG1 Meeting #99, R1-1913288, Nov. 18, 2019 (39 pages).
MediaTek Inc., "*Summary of 7.2.5.4 on more delay-tolerant re-transmission mechanisms in NR-NTN*", 3GPP TSG RAN WG1 Meeting #99, Nov. 18, 2019, R1-1913369 (15 pages).
MediaTek Inc., "*Summary of 7.2.5.4 on more delay-tolerant re-transmission mechanisms in NR-NTN*", 3GPP TSG RAN WG1 Meeting #99, Nov. 18, 2019, R1-1913327 (14 pages).
MCC Support, "*Final Report of 3GPP TSG RAN WG1 #98bis v2.0.0*", 3GPP TSG RAN WG1 Meeting #99, Nov. 18, 2019, R1-1913275 (160 pages).
MCC Support, "*Final Report of 3GPP TSG RAN WG1 #98bis v1.0.0*", 3GPP TSG RAN WG1 Meeting #99, Nov. 18, 2019, R1-1911801, (159 pages).
Ericsson, "*HARQ and scheduling enhancements for NR-U*", 3GPP TSG-RAN WG1 Meeting #99, Nov. 18, 2019, R1-1912711 (16 pages).
LG Electronics, "*HARQ procedure for NR-U*", 3GPP TSG RAN WG1 #99, Nov. 18, 2019, R1-1912391 (22 pages).
Lenovo, Motorola Mobility, "*HARQ enhancement for NR-U*", 3GPP TSG RAN WG1 #99, Nov. 18, 2019, R1-1912328 (8 pages).
Nokia, Nokia Shanghai Bell, "*Remaining details on NR-U HARQ scheduling and feedback*", 3GPP TSG RAN WG1 #99, Nov. 18, 2019, R1-1912261 (19 pages).
MediaTek Inc., "*Enhancements to HARQ and scheduling for NR-U operation*", 3GPP TSG RAN WG1 #99, Nov. 18, 2019, R1-1912090 (9 pages)
Vivo, "*Discussion on HARQ operation for NR-U*", 3GPP TSG RAN WG1#99, Nov. 18, 2019, R1-1912014 (13 pages).
Huawei, HiSilicon, "*HARQ enhancement in NR unlicensed*", 3GPP TSG RAN WG1 Meeting #99, Nov. 18, 2019, R1-1911868 (11 pages).
ZTE, "CSI feedback enhancements". 3GPP TSG RAN WG1 #100, Feb. 24, 2020, R1-20xxxxx (9 pages).
Japanese Office Action with English Translation for Application No. 2022-540690 dated Jan. 31, 2024, pp. 1-60.
Chinese Office Action with English summary, Jul. 9, 2024, pp. 1-13, issued in Chinese Application No. 202080089140.4.
European Search Report for Application No. 20895866.0 mailed Jun. 5, 2023 (12 pages).
Qualcomm Incorporated. "Scheduling of multiple DL/UL transport blocks" *3GPP TSG RAN WGI Meeting #96b R1-1904519*, Apr. 12, 2019 (10 pages).
Intel Corporation. "Enhancements to HARQ for NR-unlicensed" *3GPP TSG RAN WGI Meeting #94bis R1-1810768*, Oct. 12, 2018—(4 pages).
International Search Report and Written Opinion for International Application No. PCT/CN2020/084138 mailed Dec. 29, 2020 (6 pages).
Woltering et al., "Link Level Performance Assessment of Reliability-Based HARQ Schemes in LTE", 2014 IEEE 79th Vehicular Technology Conference (VTC Spring) 2014 (5 pages).

(56) References Cited

OTHER PUBLICATIONS

AT&T, "UCI Enhancements for NR", 3GPP TSG RAN WG1 Ad-Hoc Meeting 1901, Jan. 21, 2019, R1-1900438 (12 pages).
MediaTek Inc., "Discussion on CBG construction for CBG-based (re)transmission", 3GPP TSG RAN WG1 NR Ad-Hoc#2, R1-1710830, Jun. 30, 2017 (6 pages).
Office Action issued in Mexican Application No. MX/a/2022/ 009196 mailed Feb. 26, 2026, including English translation (10 pages).

* cited by examiner

100

300

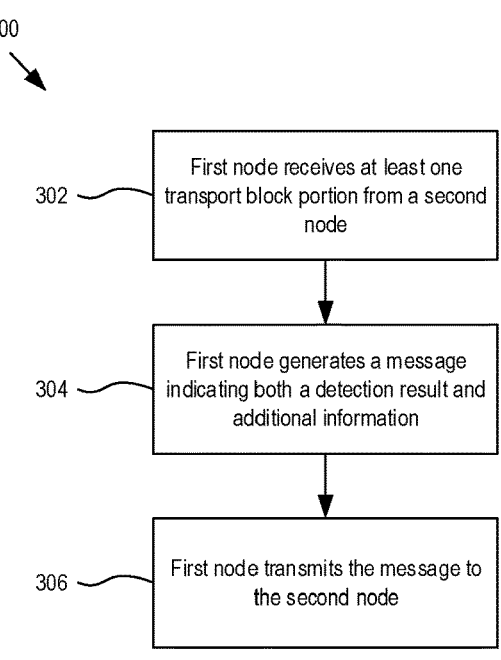

302 — First node receives at least one transport block portion from a second node 304 — First node generates a message indicating both a detection result and additional information 306 — First node transmits the message to the second node

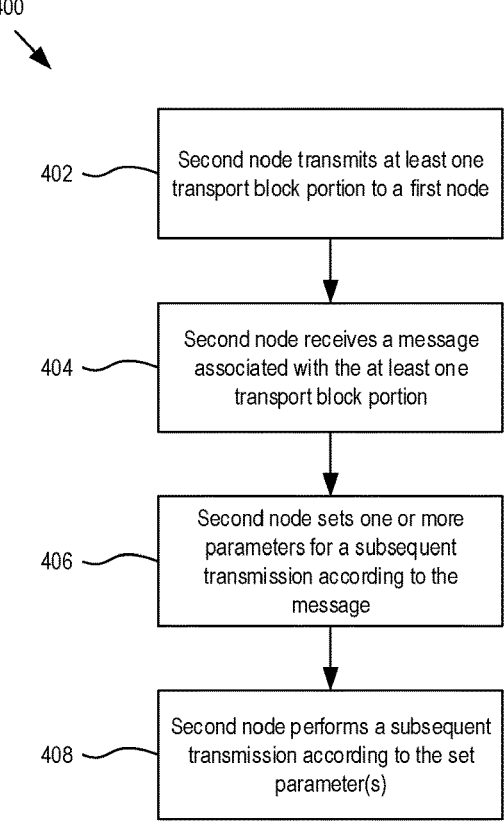

402 — Second node transmits at least one transport block portion to a first node 404 — Second node receives a message associated with the at least one transport block portion 406 — Second node sets one or more parameters for a subsequent transmission according to the message 408 — Second node performs a subsequent transmission according to the set parameter(s)

FIG. 4

METHOD FOR HARQ TRANSMISSION

CROSS-REFERENCE TO RELATED APPLICATIONS

This application is a continuation of International Patent Application No. PCT/CN2020/084138, filed Apr. 10, 2020. The contents of International Patent Application No. PCT/CN2020/084138 are herein incorporated by reference in their entirety.

TECHNICAL FIELD

This document is directed generally to configuring feedback messages for responding to transport blocks.

BACKGROUND

Hybrid automatic repeat request (HARQ) is a method for improving transmission efficiency in communication systems. This method can automatically adapt to the channel variation to increase transmission efficiency in a system. As a result, HARQ has been widely used in wireless communication systems. For many of such communication systems, only a single-bit of information is used for indicating transmission correctness in a HARQ process. For example, when a first node responds to a second node upon receipt of a packet from the second node, the single-bit is used to indicate a receive state, including either a positive acknowledgment (ACK) or a negative acknowledgement (NACK) of the packet.

However, for complicated and varying communication channels, single-bit feedback conveys limited messaging on the receive state, which in turn may lower the transmission rate. With increasing demand on communications, cellular systems are facing more and more complicated communication environments. In the New Radio (NR) access technology of the 3rd Generation Partnership Project (3GPP), i.e., the 5th generation cellular system, a new type of transmission method called code block group (CBG) transmission is used for increasing transmission efficiency. CBG transmission is a mechanism for supporting multi-bit HARQ feedback information. For example, to transmit a transport block, a second node may divide the transport block of N code blocks of M CBGs, and send the M CBGs to a first node. In turn, the first node feeds back M-bits of information, with each of the M bits corresponding to one of the M CBGs. In addition, along with the transport block, the second node needs M bits to indicate which CBG is sent for reducing resource usage in retransmissions. However, current CBG methods have drawbacks, including: CBG is only valid when large amounts of information are transmitted, the control overhead of CBG is large, and though CBG may reduce retransmission resources compared to the single-bit method, CBG does not offer reliability improvement for subsequent transmissions. As a result, current CBG methods are unable to meet ultra-reliable low-latency communication (URLLC) requirements. As such, ways to improve feedback messaging in wireless communications that enhances flexibility, reliability, and efficiency of subsequent transmissions may be desirable.

SUMMARY

This document relates to methods, systems, and devices for generation and communication of feedback messages for wireless communication.

In some implementations, a method for wireless communication is disclosed. The method includes: receiving, with a first node, at least one portion of a transport block from a second node; and transmitting, with the first node, a message to the second node, the message comprising a value that indicates both a detection result of receiving the at least one portion of the transport block, and additional information indicating to the second node how to set one or more parameters for a subsequent transmission to the first node.

In some other implementations, a method of wireless communication is disclosed. The method includes: transmitting, with a second node, at least one portion of a first transport block to a first node; receiving, with the second node, a message from the first node, the message comprising a value that indicates both a detection result of receiving the at least one portion of the transport block, and additional information indicating to the second node how to set one or more parameters for a subsequent transmission to the first node; setting, with the second node, the one or more parameters based on the value in the message; and transmitting, with the second node, at least one portion of a second transport block of the subsequent transmission to the first node according to the setting.

In some other implementations, a device, such as a network device, is disclosed. The device may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above and other aspects and their implementations are described in greater detail in the drawings, the descriptions, and the claims.

BRIEF DESCRIPTION OF THE DRAWINGS

FIG. 3 is a flow chart of an example of a wireless communication method.

FIG. 4 is a flow chart of another example of a wireless communication method.

DETAILED DESCRIPTION

The present description describes communication nodes in a system that more efficiently and reliably communicate with each other through improved feedback messages. A first node may receive at least one portion of a transport block from a second node. The first node may respond back to the second node with a message indicating a detection result of the at least one transport block portion. In doing so, the message may indicate both the transport result and additional information that indicates to the second node how to set one or more parameters for a subsequent transmission. In various embodiments, the message may include a value, such as an M-bit binary value, that indicates both the detection result and the additional information. Over multiple transmissions, the first node may be configured with the flexibility to vary what the additional information indicates to the second node. In addition or alternatively, over multiple transmissions, the first node may be able to vary the value of M of the M-bit binary value. As a result, the communication of transport blocks and/or transport block portions, including retransmissions of the transport blocks and/or transport block portions, between the nodes may be performed more reliably and/or more efficiently.

Figure 1:
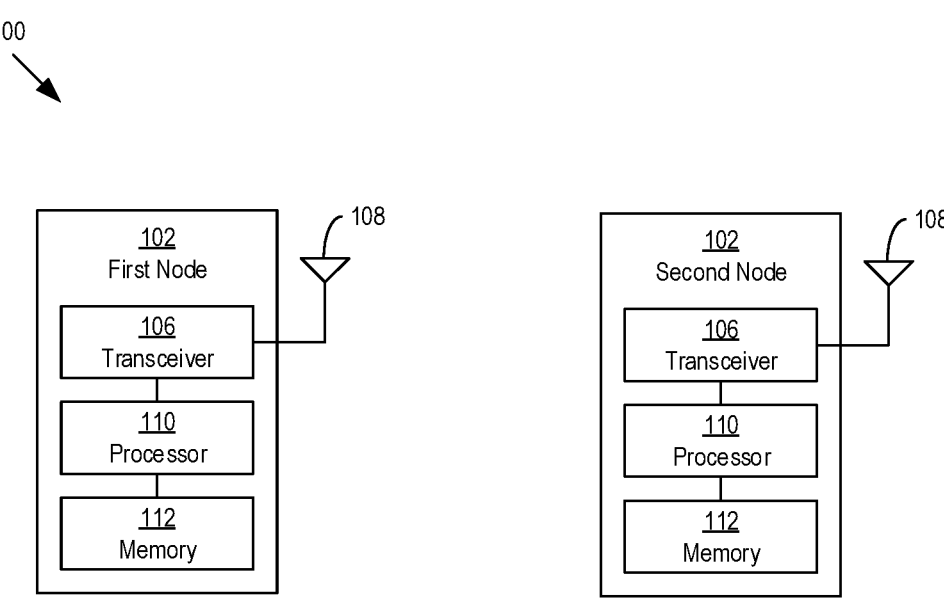
FIG. 1 shows an example of a wireless communication system.

In further detail, FIG. 1 shows a diagram of an example wireless communication system 100 including a plurality of communication nodes that are configured to wirelessly communicate with each other. The communication nodes include a first node 102 and a second node 104. Various other examples of the wireless communication system 100 may include more than two communication nodes.

In general, each communication node is an electronic device, or a plurality (or network or combination) of electronic devices, that is configured to wirelessly communicate with another node in the wireless communication system, including wirelessly transmitting and receiving signals. In various embodiments, each communication node may be one of a plurality of types of communication nodes.

One type of communication node is a user device. A user include a single electronic device or apparatus, or multiple (e.g., a network of) electronic devices or apparatuses, capable of communicating wirelessly over a network. A user device may include or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing devices that are not ordinarily moved for long periods of time, such as appliances, other relatively heavy devices including Internet of things (IoT), or computing devices used in commercial or industrial environments, as non-limiting examples).

A second type of communication node is a wireless access node. A wireless access node may comprise one or more base stations or other wireless network access points capable of communicating wirelessly over a network with one or more user devices and/or with one or more other wireless access nodes. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, in various embodiments.

As shown in FIG. 1, each communication node 102, 104 may include transceiver circuitry 106 coupled to an antenna 108 to effect wireless communication. The transceiver circuitry 106 may also be coupled to a processor 110, which may also be coupled to a memory 112 or other storage device. The processor 110 may be configured in hardware (e.g., digital logic circuitry, field programmable gate arrays (FPGA), application specific integrated circuits (ASIC), or the like), and/or a combination of hardware and software (e.g., hardware circuitry (such as a central processing unit (CPU)) configured to execute computer code in the form of software and/or firmware to carry out functions). The memory 112, which may be in the form of volatile memory, non-volatile memory, combinations thereof, or other types of memory, may be implemented in hardware, and may store therein instructions or code that, when read and executed by the processor 110, cause the processor 110 to implement various functions and/or methods described herein. Also, in various embodiments, the antenna 108 may include a plurality of antenna elements that may each have an associated phase and/or amplitude that can be controlled and/or adjusted, such as by the processor 110. Through this control, a communication node may be configured to have transmit-side directivity and/or receive-side directivity, in that the processor 110, and/or the transceiver circuitry 106, can perform beam forming by selecting a beam from among a plurality of possible beams, and transmit or receive a signal with the antenna radiating the selected beam.

Additionally, in various embodiments, the communication nodes 102, 104 may be configured to wirelessly communicate with each other in or over a mobile network and/or a wireless access network according to one or more standards and/or specifications. In general, the standards and/or specifications may define the rules or procedures under which communication nodes 102, 104 can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes 102, 104 are configured to wirelessly communicate signals between each other. In general, a communication in the wireless system 100 between two communication nodes can be or include a transmission or a reception, and is generally both simultaneously, depending on the perspective of a particular node in the communication. For example, for a communication between the first node 102 and the second node 104, where the first node 102 is transmitting a signal to the second node 104 and the second node 104 is receiving the signal from the first node 102, the communication may be considered a transmission for the first node 102 and a reception for the second node 104. Similarly, where the second node 104 is transmitting a signal to the first node 102 and the first node 102 is receiving the signal from the second node 102, the communication may be considered a transmission for the second node 104 and a reception for the first node 102. Hereafter, for simplicity, communications between two nodes are generally referred to as transmissions.

Additionally, various signals that are communicated between nodes may carry data, information, or messages in the form of transport blocks. A transport block is a single unit of data that a communication node transmits or receives. Additionally, in various embodiments, the communication nodes may identify and/or communicate finer granularities of data than a transport block, called code blocks or called code block groups (CBGs). In general, a plurality or set of code blocks or CBGs may form a transport block. Various communication standards or protocols, such as those in 5G NR, may define transport blocks, code blocks, and CBGs, that a communication node generates and/or communicates.

Figure 2:
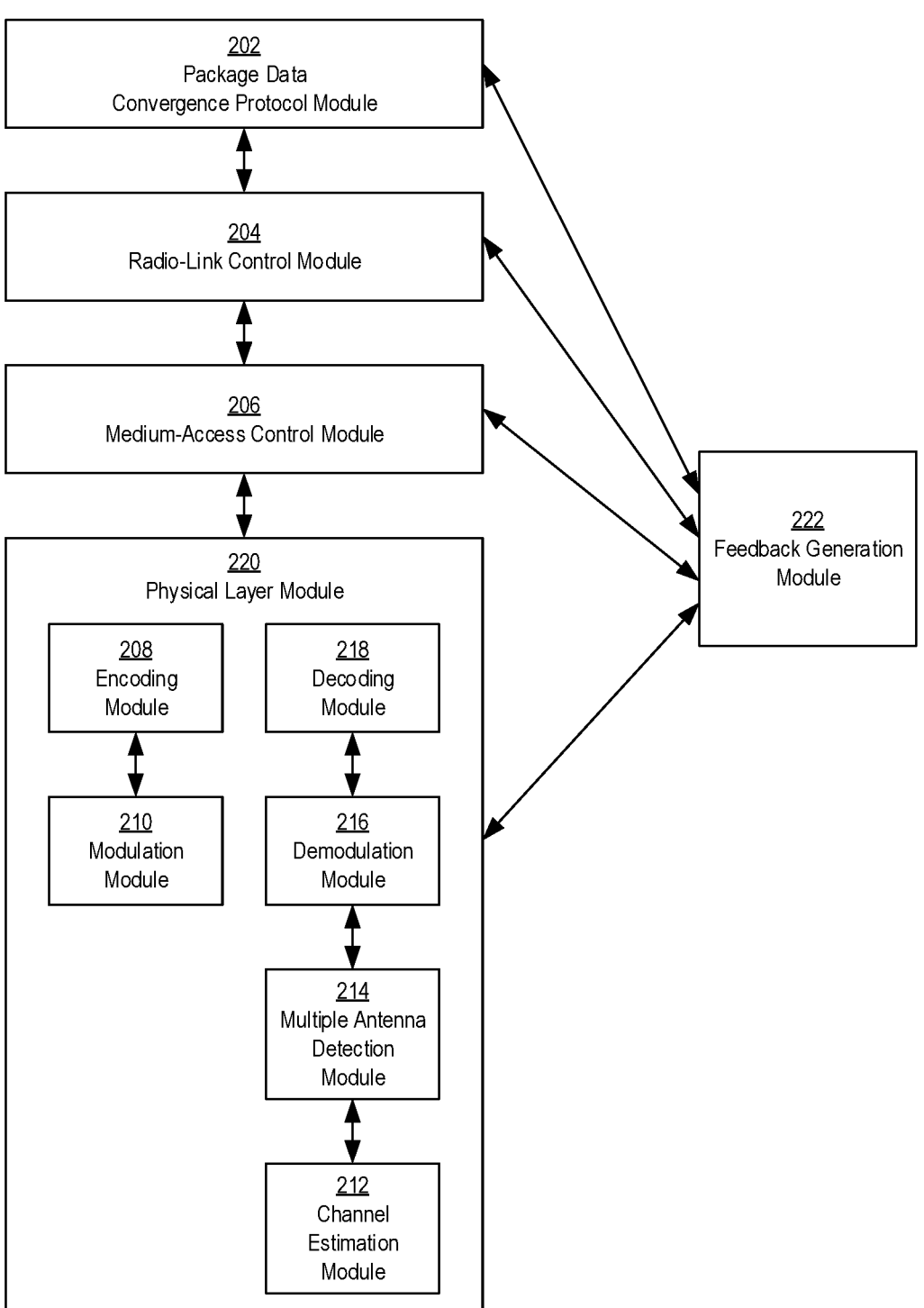
FIG. 2 shows example modules of a communication node of the wireless communication system of FIG. 1.

FIG. 2 shows a block diagram of a plurality of modules of a communication node, including a package data convergence protocol (PDCP) module 202, a radio-link control (RLC) module 204, a medium-access control (MAC) module 206, an encoding (or encoder) module 208, a modulation (or modulator) module 210, a channel estimation (or estimator) module 212, a multiple antenna detection (or detector) (also called a multiple-input multiple-output (MIMO) detection (or detector) module 214, a demodulation (or demodulator) module 216, a decoding (or decoder) module 218. In general, as used herein, a module is an electronic device, such as electronic circuit, that includes hardware or a combination of hardware and software. In various embodiments, a module may be considered part of, or a component of, or implemented using one or more of the components of a communication node of FIG. 1, including a processor 110, a memory 112, a transceiver circuit 106, or the antenna 108. For example, the processor 110, such as when executing computer code stored in the memory 112, may perform the functions of a module. Additionally, in various embodiments, the functions that a module performs may be defined by one or more standards or protocols, such as 5G NR for example.

For at least some example embodiments, all or some of the encoding module 208, the modulation module 210, the channel estimation module 212, the multiple antenna detection module 214, the demodulation module 216, and the decoding module 218, such as shown in FIG. 2, are part of, components of, or sub-modules of, a physical layer module 220. Also, in various embodiments, the PDCP module 202, the RLC module 204, the MAC module 206 and the PHY module 220 may be, or the functions that they perform may be, part of a plurality of protocol layers (or just layers) into which various functions of the communication node are organized and/or defined. Among the four modules 202, 204, 206, 220 in FIG. 2, the PHY module 220 may be or correspond to the lowest layer, the MAC module 206 may be or correspond to the second-lowest layer (higher than the PHY module 220), the RLC module 204 may be or correspond to the third lowest layer (higher than the PHY module 220 and the MAC module 206), and the PDCP module 202 may be or correspond to the fourth-lowest (or highest among the four, i.e., higher than the PHY module 220, the MAC module 206, and the RLC module 204). In various embodiments, a communication node may include modules and/or protocol layers other than those shown in FIG. 2.

The modules shown in FIG. 2 may be perform various functions and communicate with each other, such as by communicating signals or messages between each other, in order to send and receive transport blocks. The package data convergence protocol module 202 may perform functions including, but not limited to, Internet Protocol (IP) header compression and decompression, ciphering and deciphering, integrity protection, retransmission management, in-sequence delivery, duplicate removal, dual connectivity, and handover functions.

The radio-link control module 204 may perform segmentation of service data units (SDU) to suitably sized protocol data units (PDU). In various embodiments, a data entity from/to a higher protocol layer or module is called a SDU, and the corresponding data entity to/from a lower protocol layer or module is called a PDU. The RLC module 204 may also perform retransmission management that involves monitoring sequence numbers in PDUs in order to identify missing PDUs. Additionally, the RLC module 204 may communicate status reports to enable retransmission of missing PDUs. The RLC module 204 may also be configured to identify errors due to noise or channel variations.

The MAC module 206 may perform or handle logical-channel multiplexing and demultiplexing, hybrid automatic repeat request (HARQ) retransmissions, and scheduling-related functions, including the assignment of uplink and downlink resources in both the frequency domain and the time domain. Additionally, the MAC module 206 may determine transport formats specifying how a transport block is to be transmitted. A transport format may specify a transport-block size, a coding and modulation mode, and antenna mapping. By varying the parameters of the transport format, the MAC module 206 can effect different data rates.

The MAC module 206 may also control distributing data from flows across different component carriers or cells for carrier aggregation.

The encoding module 208 and the modulation module 210 may be used for transmitting transport blocks. The encoding module 208 may be configured to encode (or code) data for a transport block to be transmitted to another communication node. Encoding the data may allow the receiving communication node to determine if the data includes any errors. The encoding module 208 may encode data according to any of various encoding (or coding) schemes and/or in accordance with any of various coding and modulation modes, as described in further detail below. The modulation module 210 may modulate data (e.g., encoded data) according to any of various modulation schemes or types, such as quadrature amplitude modulation (QAM) and quadrature phase shift keying (QPSK), as non-limiting examples.

For receiving transport blocks, the channel estimation module 212 may perform channel estimation to determine channel state information on one or more channels on which the communication node receives signals. Details related to channel state information is described in further detail below. The multiple antenna detection module 214 may perform signal recovery of different signals, which the transmitting communication node may transmit on multiple antenna elements. The demodulation module 216 may demodulate received data (e.g., a received transport block, or a portion of a transport block), and the decoding module 218 may decode received data (e.g., demodulated data). As part of the decoding process, the decoding module 214 may identify errors in the received data.

A communication node may further include a feedback generation module 222 that is configured to generate a message, in response to receipt of at least one portion of a transport block from another communication node, that the communication node transmits (or feeds back) to the other node. Hereafter, for clarity, the communication node that receives at least one transport block portion, and that generates and transmits the message is referred to as the first node 102, and the communication node that transmits the at least one transport block portion and receives the message is referred to as the second node 104. However, reference to the first and second nodes 102, 104 in this way is not meant to be limiting, and in various embodiments, the roles of the first and second nodes 102, 104 may be reversed, and/or both the first node 102 and the second node 104 may include a feedback generation module 222, and/or both the first node 102 and the second node 104 may be configured to perform the functions of itself and the functions of the other node, at various times, depending on whether it is the node transmitting the at least one transport block portion, or the message in response to the at least one transport block portion, for a given communication.

Also, in various embodiments, the feedback generation module 222 may be a component separate from one of the other modules and/or part of its own protocol layer. In other embodiments, the feedback generation module 222 may be sub-module of one or more of the other modules 202-220, and/or part of a particular protocol layer. Various configurations of the feedback generation module 222 may be possible.

Additionally, in general, a transport block may have an associated total size (e.g., number of bits), and one portion (or a portion) of the transport block may be a part of the transport block that has a size (number of bits) that is less than the total size of the transport block. In various embodiments, a portion of a transport block may include a code block, a code block group (CBG), or any other data or collection of bits having a size less than the total size of the transport block. Accordingly, the phrase "at least one portion of a transport block" (also called the "at least one transport block portion") refers to all, or at least some and less than all, of the bits that are part of, or that form, a transport block.

Further, the message that the feedback generation module 222 generates indicates both a detection result of receiving the at least one transport block portion, and additional information that indicates to the second node 104 how to set one or more parameters for a subsequent transmission to the first node 102. The message that the feedback generation module 222 generates, and that the first node 102 ultimately transmits to the second node 104, may be used for, or instead of, an acknowledgement message that the first node 102 would send in accordance with a HARQ feedback process. For example, rather than respond to the second node 104 with only a detection result of receiving the at least one transport block portion (which may be in the form of a single bit value indicating a positive acknowledgement (ACK) or a negative acknowledgement (NACK)), the first node 102 instead sends the message to the second node 104.

As indicated, a detection result indicates acknowledgement information regarding the first node's 102 receipt of the at least one transport block portion. The receipt may be of one of two types, including a successful receipt and an unsuccessful receipt. If the first node 102 successfully receives the at least one transport block portion, then the detection result indicates (or the acknowledgement information includes) a positive acknowledgement (ACK) indicating that the first node 102 successfully received the at least one transport block portion. Additionally, if the first node 104 unsuccessfully receives the at least one transport block portion, then the detection result indicates (or the acknowledgement information includes) a negative acknowledgement (NACK) indicating that the first node 102 unsuccessfully received the at least one transport block portion.

In various embodiments, the first node 102 may determine whether it successfully received the at least one transport block portion in various ways. For at least some embodiments, the decoding module 218 may make the determination based on a decoding result. For example, upon decoding the at least one transport block portion, the decoding module 218 may determine an error status. In various embodiments, the error status may indicate a number of errors, an error rate associated the at least one transport block portion, and/or whether the decoding module 218 was able to successfully correct a threshold number (e.g., all) of determined errors. Details concerning error status determined by the decoding module 218 is described in further detail below. If the error status is acceptable (e.g., a number of bit errors is below a threshold level (e.g., 0 bit errors for at least some embodiments), or the decoding module 218 corrected or is able to correct the threshold number of bit errors), then the feedback generation module 222 may generate the message to indicate successful receipt (or positive acknowledgement) of the at least one transport block portion. On the other hand, if the errors status is unacceptable (e.g., the number of bit errors exceeds a threshold level or the decoding module is unable to correct a threshold number of bit errors), then the feedback generation module 222 may generate the message to indicate unsuccessful receipt (or negative acknowledgement) of the at least one transport block portion.

In the event that the message indicates unsuccessful receipt, then the second node 104, upon receipt of the message, may perform a retransmission—i.e., retransmit the at least one transport block portion to the first node 102. On the other hand, in the event that the message indicates successful receipt, then the second node 104, upon receipt of the message, may determine that no retransmissions are needed, and in turn refrain from retransmitting the at least one transport block portion.

Also, as mentioned, the message that the feedback generation module 222 generates indicates additional information that indicates to the second node 104 how to set one or more parameters for a subsequent transmission to the first node 102. A subsequent transmission includes a transmission to the first node 102, from the second node 104 (or another communication in the communication system 100) occurring or performed after the transmission of the at least one transport block portion that the second node 104 transmitted to the first node 102. In this context, the transmission of the at least one transport block portion for which the first node 102 generates the message may be considered, or referred to as, a current transmission. Additionally, in various embodiments, a subsequent transmission is a next transmission or a transmission that the second node 104 performs directly after the current transmission (e.g., there are no transmissions in between the current transmission and the subsequent transmission). In other embodiments, a subsequent transmission is a transmission performed after the current transmission other than a next transmission or a transmission performed directly after the current transmission (e.g., there are one or more transmissions performed in between the current transmission and the subsequent transmission). Also, transmissions themselves may also or alternatively be referred to as transmission instances, with each transmission instance being a transmission, from one node to another node, of a given at least one transport block portion. In this way, each transmission or transmission instance, may be a communication of data identified as occurring separately or discretely from each other. Additionally, the subsequent transmission may be a retransmission of the at least one transport block portion, or a transmission of a different at least one transport block portion. The different at least one transport block portion may be a different portion of the same transport block transmitted in the current transmission, or at least one portion of a different transport block.

In addition, a parameter for a transmission is a property or a characteristic of the transmission, and that the second node 104 sets, controls and/or adjusts for the transmission. The parameter may be an operating parameter of the second node 104, such as transmit power or a transmit beam of the second node's 104 antenna 108; a transmission resource used during the transmission; or a parameter of a coding and modulation mode of the data being transmitted during the transmission. A transmission resource may include at least one of: a transmission bandwidth, a transmission duration, a number of resource blocks, a number of subcarriers, a number of resource elements, a number of modulation symbols, or a number of output bits of the encoder (encoding module 208). In addition, a parameter of a coding and modulation mode may include at least one of: an encoding rate, a modulation type, a redundancy version, a process for generating code bits, or a spectral efficiency. In various embodiments, the process for generating code bits may include at least one of: generator matrices, parity-check matrices, generator polynomials, interleaving patterns, puncturing patterns, shortening patterns, scrambling sequences, or freezing sequences. Other parameters that the second node 104 may set or adjust for a transmission are possible.

Upon receipt of the message, the second node 104 may set one or more parameters, which may include adjusting the values of those one or more parameters from the prior transmission, according to the additional information indicated in the message. As a result of using the additional information in the message, the second node 104 may perform one or more subsequent transmissions more efficiently under a given reliability, or achieve a given reliability with less retransmissions of a given at least one transport block portion. An example given reliability may be a transport block error rate.

The feedback generation module 222 may generate a given message according to at least one of a plurality of message types. In other words, the message may be generated according to only one message type or a combination of message types. A message type may be one of the following: a detection state information type, a transmission resource type, a coding and modulation mode type, a channel state information type, or an error rate type. A message that is generated according to a given message type indicates and/or includes at least one aspect of, or that corresponds to, that given message type.

An aspect of the detection state information type is a detection state information set that includes at least one detection state information parameter associated with receipt of the at least one transport block portion. A detection state information parameter may include: one or more, such as one or a sequence of, receive powers of at least one transport block portion; one or more, such as one or a sequence of, input signal-to-noise ratios (SNRs) of the multiple antenna detector module 214; one or more of, such as one or a sequence of, output SNRs of the multiple antenna detector module 214; at least one output signal statistic of the multiple antenna detector module 214; at least one input signal statistic of the multiple antenna detector module 214; one or more, such as one or a sequence of, input SNRs of the demodulation module 216; one or more, such as one or a sequence of, output SNRs of the demodulation module 216; at least one output signal statistic of the demodulation module 216; at least one input signal statistic of the demodulation module 216; one or more, such as one or a sequence of, input SNRs of the decoding module 218; one or more, such as one or a sequence of, output SNRs of the decoding module 218; at least one output signal statistic of the decoding module 218; or at least one input signal statistic of the decoding module 218. In various embodiments, a statistic of an input signal or an output signal is a mean, a variance, a second-order moment, or a moment having a higher order than the second-order moment.

In various embodiments, the feedback generation module 222 may be configured to convert one or more of the detection state information parameters of the detection state information set into a detection state information value that is indicative or representative of the detection state information set, or that is another aspect of the detection state information type. For at least some embodiments, the feedback generation module 222 may be configured to use the value(s) of the detection state information parameter(s) as one or more inputs to a predetermined equation or algorithm, and using the equation or algorithm, calculate or determine a detection state information value as a function of the inputs. Also, in various embodiments, the feedback generation module 222 may determine the detection state information value according to a signaling configuration of a protocol layer higher than the physical layer (e.g., the MAC layer, the RLC layer, or the PDCP layer).

Another aspect of the detection state information type is a relative value between a detection state information set associated with the at least one transport block portion and one or more associated reference values. In general, an associated reference value may be a known or predetermined value with which the feedback generation module 222 is preconfigured or to which the feedback generation module 222 otherwise has access. Also, in particular examples, a relative value may be or correspond to a ratio or a difference between a detection state information value or a detection state information parameter value and the associated reference value. In some embodiments, upon receipt of the at least one transport block portion by the first node 102, the feedback generation module 222 may determine the detection state information value, and then determine the relative value between the detection state information value and the associated reference value. To illustrate, suppose the detection state information parameters includes an input SNR and an output SNR of the multiple antenna detector module 214. The feedback generation module 222 may determine a detection state information value based on the input SNR and the output SNR of the multiple antenna detector module 214, and then determine a relative value between the detection state information value and a reference value. In other embodiments, upon receipt of the at least one transport block portion by the first node 102, the feedback generation module 222 may determinate a plurality of pre-relative values, each between a respective detection state information parameter and an associated reference value, and then determine a relative value based on a combination of the plurality of pre-relative values. To illustrate, suppose the detection state information parameters includes an input SNR and an output SNR of the multiple antenna detector module 214, as above. The feedback generation module 222 may first determine a first pre-relative value between the input SNR and a first reference value and a second pre-relative value between the output SNR and a second reference value, and then determine a relative value based on a combination of the first and second pre-relative values. Various ways of determining a relative value between a detection state information set associated with the at least one transport block portion and one or more associated reference values may be possible.

Another aspect of the detection state information type is a relative value between a detection state information set associated with the at least one transport block portion of a current transmission and a second detection state information set associated with a second at least one transport block portion transmitted in a prior transmission. Similar to a subsequent transmission, a prior transmission includes a transmission to the first node 102, from the second node 104 (or another communication in the communication system 100) occurring or performed before the current transmission of the at least one transport block portion that the second node 104 transmitted to the first node 102. In various embodiments, a prior transmission is a directly prior transmission or a transmission that the second node 104 performs directly before the current transmission (e.g., there are no transmissions in between the prior transmission and the current transmission). In other embodiments, a prior transmission is a transmission performed before the current transmission other than a directly prior transmission (e.g., there are one or more transmissions performed in between the prior transmission and the current transmission). Additionally, in various embodiments, prior transmissions include an earliest transmission, or an earliest transmission instance, which is a transmission of at least one transport block portion that the first node 102 receives before any retransmission of the at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first detection state information value based on the value(s) of the parameter(s) of the detection state information set for the current transmission, and may also determine a second detection state information value based on the value(s) of the parameter(s) of the detection state information set for the prior transmission. The feedback generation module 222 may then determine a relative value between the first and second detection state information values. In particular examples, the relative value is, or corresponds to, a ratio or a difference between the first and second detection state information values.

In addition, for embodiments where the feedback generation module 222 is configured to generate the message according to the detection state information type, the message may indicate a closeness of the detection state information parameter(s) to one or more target or optimal values, which may be indicated by a detection state information value or one or more of the relative values indicated in the message. Upon receipt of the message, the second node 104 may analyze the closeness as indicated in the message. The closer the detection state information parameter(s) is/are to the target value(s), the more the second node 104 may determine to reduce one or more amounts of one or more transmission resources for a subsequent transmission (e.g., reduce an amount of bandwidth or transmission duration, etc.). As a result, transmission resources may be saved and throughput may be improved. Additionally, the farther away the detection state information parameter(s) is/are to the target value(s), the more the second node 104 may determine to increase one or more amounts of one or more transmission resources for a subsequent transmission (e.g., increase an amount of bandwidth or transmission duration, etc.). In general, through this feedback of additional detection state information, the second node 104 can adapt to channel changes rapidly, and the number of transmissions, including retransmission, can be reduced.

An aspect of the transmission resource type is a transmission resource set for a subsequent transmission. A transmission resource set includes at least one transmission resource, as previously identified. In various embodiments, the feedback generation module 222 may be configured to convert one or more of the transmission resources of the transmission resource set into a transmission resource number that is indicative or representative of the transmission resource set, or that is another aspect of the transmission resource type. For at least some embodiments, the feedback generation module 222 may be configured to use the value(s) of the transmission resource(s) as one or more inputs to a predetermined equation or algorithm, and using the equation or algorithm, calculate or determine a transmission resource number as a function of the inputs. Also, in various embodiments, the feedback generation module 222 may be configured to determine the transmission resource number according to a signaling configuration of the physical layer (PHY).

Another aspect of the transmission resource type is a relative value between a first transmission resource set for a current transmission of the at least one transport block portion, and a second transmission resource set for a subsequent transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first transmission resource number based on the first transmission resource set of the current transmission, and may also determine a second transmission resource number based on the second transmission resource set for the subsequent transmission. The feedback generation module 222 may then determine a relative value between the first and second transmission resource numbers. In particular examples, the relative value is, or corresponds to, a ratio or a difference between the first and second transmission resource numbers.

Another aspect of the transmission resource type is a relative value between a first transmission resource set for a current transmission of the at least one transport block portion, and a second transmission resource set for a prior transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first transmission resource number based on the first transmission resource set of the current transmission, and may also determine a second transmission resource number based on the second transmission resource set for the prior transmission. The feedback generation module 222 may then determine a relative value between the first and second transmission resource numbers. In particular examples, the relative value is, or corresponds to, a ratio or a difference between the first and second transmission resource numbers.

Another aspect of the transmission resource type is a relative value between a first transmission resource set for an earliest transmission of the at least one transport block portion, and a second transmission resource set for a subsequent transmission of the same at least one transport block portion. In various embodiments, the feedback generation module 222 may determine a first transmission resource number based on the first transmission resource set of the earliest transmission, and may also determine a second transmission resource number based on the second transmission resource set for the subsequent transmission. The feedback generation module 222 may then determine a relative value between the first and second transmission resource numbers. In particular examples, the relative value is, or corresponds to, a ratio or a difference between the first and second transmission resource numbers.

An aspect of the coding and modulation mode type is a coding and modulation mode set for a subsequent transmission. A coding and modulation mode set includes at least one parameter of a coding and modulation mode, as previously identified. In various embodiments, the feedback generation module 222 may be configured to convert one or more parameters of a coding and modulation mode set into a coding and modulation mode value that is indicative or representative of the coding and modulation mode set, or that is another aspect of the coding an modulation mode type. For at least some embodiments, the feedback generation module 222 may be configured to use the value(s) of the parameters of the coding and modulation mode set as one or more inputs to a predetermined equation or algorithm, and using the equation or algorithm, calculate or determine a coding and modulation mode value as a function of the inputs.

Another aspect of the coding and modulation mode type is a relative value between a coding and modulation mode set for a current transmission of the at least one transport block portion, and a second coding and modulation mode set for a subsequent transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first coding and modulation mode value based on the first coding and modulation mode set of the current transmission, and may also determine a second coding and modulation mode value based on the second coding and modulation mode set for the subsequent transmission. The feedback generation module 222 may then determine a relative value between the first and second coding and modulation mode values. In particular examples, the relative value is, or corresponds to, a ratio or a difference between the first and second coding and modulation mode values.

Another aspect of the coding and modulation mode type is a relative value between a first coding and modulation mode set for a current transmission of the at least one transport block portion, and a second coding and modulation mode set for a prior transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first coding and modulation mode value based on the first coding and modulation mode set of the current transmission, and may also determine a second coding and modulation mode value based on the second coding and modulation mode set for the prior transmission. The feedback generation module 222 may then determine a relative value between the first and second coding and modulation mode values. In particular examples, the relative value is, or corresponds to, a ratio or a difference between the first and second coding and modulation mode values.

Another aspect of the coding and modulation mode type is a relative value between a coding and modulation mode set for an earliest transmission of the at least one transport block portion, and a second coding and modulation mode set for a subsequent transmission of the same at least one transport block portion. In various embodiments, the feedback generation module 222 may determine a first coding and modulation mode value based on the first coding and modulation mode set of the earliest transmission, and may also determine a second coding and modulation mode value based on the second coding and modulation mode set for the subsequent transmission. The feedback generation module 222 may then determine a relative value between the first and second coding and modulation mode values. In particular examples, the relative value is, or corresponds to, a ratio or a difference between the first and second coding and modulation mode values.

An aspect of the channel state information type is a channel state information set that includes at least one channel state information parameter associated with receipt of the at least one transport block portion. A channel state information parameter may include one or more, such as one or a sequence of, channel SNRs; one or more, such as one or a sequence of, pilot signal receive powers; one or more, such as one or a sequence of, noise powers; one or more, such as one or a sequence of, interference powers; one or more, such as one or a sequence of, input SNRs of the channel estimation module 212; one or more, such as one or a sequence of, output SNRs of the channel estimation module 212; at least one output signal statistic of the channel estimation module 212; at least one input signal statistic of the channel estimation module 212; one or more, such as one or a sequence of, channel quality indicators; one or more, such as one or a sequence of, precoding matrix indicators, or one or more, such as one or a sequence of, rank indicators. Additionally, in various embodiments, a statistic of an input signal or an output signal is a mean, a variance, a second-order moment, or a moment having a higher order than the second-order moment. Additionally, in various embodiments, the feedback generation module 222 may be configured to determine one or more of the channel state information parameters from one or more reference signals or one or more pilot signals. Example reference signals include, but are not limited to, demodulation reference signals, channel state information reference signals, phase-tracking reference signals, and/or sounding reference signals.

In various embodiments, the feedback generation module 222 may be configured to convert one or more of the channel state information parameters of the channel state information set into a channel state information value that is indicative or representative of the channel state information set, or that is another aspect of the channel state information type. For at least some embodiments, the feedback generation module 222 may be configured to use the value(s) of the channel state information parameter(s) as one or more inputs to a predetermined equation or algorithm, and using the equation or algorithm, calculate or determine a channel state information value as a function of the inputs. Also, in various embodiments, the feedback generation module 222 may be configured to determine the channel state information value, and/or the parameters used to determine the channel state information value, according to a signaling configuration of a protocol layer higher than the physical layer, such as the MAC layer, the RLC layer, or the PDCP layer.

Another aspect of the channel state information type is a relative value between a channel state information set associated with the at least one transport block portion and one or more associated reference values. Also, in particular examples, a relative value may be or corresponds to a ratio or a difference between a channel state information value or a channel state information parameter value and the associated reference value. In some embodiments, upon receipt of the at least one transport block portion by the first node 102, the feedback generation module 222 may determine the channel state information value, and then determine the relative value between the channel state information value and the associated reference value. To illustrate, suppose the channel state information parameters include a channel SNR, a pilot signal receive power, and a channel quality indicator. The feedback generation module 222 may determine a channel state information value based on the channel SNR, the pilot signal receive power, and the channel quality indicator, and then determine a relative value between the channel state information value and a reference value. In other embodiments, upon receipt of the at least one transport block portion by the first node 102, the feedback generation module 222 may determinate a plurality of pre-relative values, each between a respective channel state information parameter and an associated reference value, and then determine a relative value based on a combination of the plurality of pre-relative values. To illustrate, suppose the channel state information parameters includes a channel SNR, a pilot signal receive power, and a channel quality indicator, as above. The feedback generation module 222 may first determine a first pre-relative value between the channel SNR and a first reference value, a second pre-relative value between the pilot signal receive power and a second reference value, a third pre-relative value between the channel quality indicator and a third reference value, and then determine a relative value based on a combination of the first, second, and third pre-relative values. Various ways of determining a relative value between a channel state information set associated with the at least one transport block portion and one or more associated reference values may be possible.

Another aspect of the channel state information type is a relative value between a first channel state information set for a current transmission of the at least one transport block portion, and a second channel state information set for a subsequent transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first channel state information value based on the first channel state information set of the current transmission, and may also determine a second channel state information value based on the second channel state information set for the subsequent transmission. The feedback generation module 222 may then determine a relative value between the first and second channel state information values. In particular examples, the relative value is, or corresponds to, a ratio or a difference between the first and second channel state information values.

Another aspect of the channel state information type is a relative value between a first channel state information set for a current transmission of the at least one transport block portion, and a second channel state information set for a prior transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 may determine a first channel state information value based on the first channel state information set of the current transmission, and may also determine a second channel state information value based on the second channel state information set for the prior transmission. The feedback generation module 222 may then determine a relative value between the first and second channel state information values. In particular examples, the relative value is, or corresponds to, a ratio or a difference between the first and second channel state information values.

An aspect of the error rate type is an error rate set that includes at least one error rate associated with receipt of the at least one transport block portion. A given error rate may be of one of two types, including a bit error rate and a transport block portion error rate. In general, as used herein, a bit error rate is or corresponds to a ratio between a number of bit errors of at least one transport portion and a total number of bits of the at least one transport block portion. A transport block portion error rate is or corresponds to a ratio between a number of erroneous transport block portions and a total number of a transport block portions of a transport block. A transport block is an erroneous transport block if it is detected (e.g., by the decoding module 218) to have a threshold number of bit errors or if its associated bit error rate exceeds a threshold). Non-limiting examples of a transport block portion error rate include code block error rate corresponding to a transport block including or organized into a predetermined number of code blocks, or a code block group error rate corresponding to a transport block including or organized into a predetermined number of code block groups. Other types of transport block error rates are possible, depending on how a given transport block is divided or organized into a plurality of portions. Accordingly, for embodiments where the at least one transport block portion of a transmission includes multiple transport block portions, the decoding module 218 may determine a transport block portion error rate for the multiple transport block portions.

Another aspect of the error rate type includes one or more relative values between a first error rate set for a current transmission of the at least one transport block portion, and a second error rate set for a prior transmission of a second at least one transport block portion. The second at least one transport block portion may either be the same as (e.g., the same bit sequence) or different from (e.g., different bit sequences) the at least one transport block portion of the current transmission. In various embodiments, the feedback generation module 222 (such as through communication with the decoding module 218) may determine a first error rate set according to receipt of the at least one transport block portion of the current transmission, and may also determine a second error rate set according to receipt of the second at least one transport block portion of the prior transmission. Each of the first and second error rate sets may include at least one of bit error rate or a transport block portion error rate. The feedback generation module 222 may then determine one or more relative values between the first and second error rate sets. In particular examples, the relative value is, or corresponds to, a ratio or a difference between the first and second error rate sets. Additionally, in various embodiments, a given relative value may be between two error rates of the same error rate type. For example, one relative value may be between a first bit error rate of the first error rate set and a second bit error rate of the second error rate set, and a second relative value may be between a first transport block portion error rate of the first error rate set and a second transport block portion error rate of the second error rate set.

FIG. 3 shows a flow chart of a feedback messaging method 300 for wireless communication. At block 302, the first node 102 receives at least one portion of a transport block of a current transmission from the second node 104. At block 304, the first node 102, such as with the feedback generation module 222, may generate a message to transmit to the second node 104. The message indicates both a detection result of receiving the at least one transport block portion, and additional information that indicates to the second node 104 how to set one or more parameters for a subsequent transmission to the first node 102. The additional information indicated in the message may include one or more aspects of the one or more message types according to which the first node 102 generates the message, as previously described. To illustrate, if the first node 102 is to generate the message according to the detection state information state type, and an aspect of detection state information state type is a detection state information value associated with receipt of the at least one transport block portion, then the first node 102 generates the message to indicate the detection state information value.

For at least some example embodiments, the first node 102 may determine or select a message type from among a plurality of message types according to which to generate the message. For embodiments where the first node 102 generates the message according a combination of two or more message types, then the first node 102 may determine or select the two or more message types from among the plurality of message types. In other example embodiments, the second node 104, rather than the first node 102, determines or selects a message type, or a combination of two or more message types, from among a plurality of message types, and transmits information of the selection to the first node 102, so that the first node 102 knows the message type(s) according to which to generate the message. Various ways of the second node 104 transmitting information of one or more message types to the first node, including before, during (as part of), or after a current transmission are possible.

In addition or alternatively, the first node 102 may determine or select one or more aspects from among a plurality of aspects, for each of one or more message types according to which the message is generated. As mentioned above, a set of one or more aspects of a given message type may include at least one of: a value (e.g., a detection state information value, a transmission resource number, a coding and modulation mode value, a channel state information value, or an error rate), a relative value between a value and a reference value, a relative value between a first value of a current transmission and a second value of a subsequent transmission, a relative value between a first value of a current transmission and a second value of an earliest transmission, or a relative value between a first value of a current transmission and a second value of a prior transmission. In other example embodiments, the second node 104, rather than the first node 102, determines or selects one or more aspects from among a plurality of aspects for each of one or more message types according to which the message is generated. For such embodiments, the second node 104 transmits information of the determined/selected aspect(s) to the first node 102 so that the first node 102 knows which aspect(s) to include in the additional information indicated in the message.

In addition or alternatively, the first node 102 may determine or select one or more message parameters on which a value of a given message type depends, for each message type according to which the message is generated. Example message parameters include detection state information parameters used to determine a detection state information value, transmission resources used to determine a transmission resource number, coding and modulation mode parameters used to determine a coding and modulation mode value, channel state information parameters used to determine a channel state information value, or a bit error rate or a transport block portion error rate used to determine an error rate, as mentioned above. In other example embodiments, the second node 104, rather than the first node 102, determines or selects one or more message parameters for each message type according to which the message is generated. For such embodiments, the second node 104 transmits information on the determined/selected message parameter(s) to the first node 102 so that the first node 102 knows which message parameters to use to determine the value(s) for each message type according to which the message is generated.

Additionally, in various embodiments, the first node 102 or the second node 104 may select or determine the message type, the aspects, and/or the message parameters depending on a transmission instance number. In turn, the first node 102 or the second node 104 may determine the same or different message types, aspects, message parameters, or combinations thereof, for different transmission instance numbers. As an example, for a current transmission associated with a first transmission instance number, the first node 102 may determine to generate a first message according to a detection state information type, a channel state information type, and an error rate type, and for a subsequent transmission associated with a second transmission instance number, the first node 102 may determine to generate a second message according to a channel state information type and a coding and modulation mode type. As another example, for a current transmission associated with a first transmission instance number, the first node 102 may determine to indicate a value (e.g., a detection state information value or a channel state information value) and for a subsequent transmission associated with a second transmission instance number, the first node 102 may determine to indicate a relative value. As another example, for a current transmission associated with a first transmission instance number, the first node 102 may indicate in a first message an encoding rate, a modulation type, and a redundancy version, and for a subsequent transmission associated with a second transmission instance number, the first node may indicate in a second message an encoding rate and a modulation type, but not a redundancy version. For embodiments where the first node 102 determines a value (e.g., a detection state information value or a channel state information value) for a given message type by using an equation or an algorithm, the transmission instance number may determine the message parameters that the first node 102 is to use as inputs into the equation or algorithm for determining the value.

Accordingly, the first node 102 may choose different message types, different combinations of message types, different aspects or different combinations of aspects of a given message type, or different message parameters or combinations of message parameters of a given aspect for different transmission instances. In turn, over a plurality of transmissions, the first node 102 can dynamically feedback a plurality of messages, each including different additional information corresponding to different message types, aspects, and/or message parameters, and/or different combinations of message types, aspects, and/or message parameters. Such dynamic feedback capability may provide the first node 102 with an enhanced degree of flexibility in the type of information it is able to indicate in feedback messages when responding to received transport blocks, which in turn can improve transmission efficiency and/or reduce number of subsequent transmissions, including retransmissions.

In addition, in various embodiments, the first node 102 may generate or determine a message value to include in the message that indicates both the detection result and the additional information. The message value that the first node 102 determines may be one message value among a plurality of possible message values that the first node 102 can choose or select from when generating the message. For at least some example embodiments, the message value is an M-bit binary value, where M is one or more. Accordingly, for a given message, the first node 102 may determine a binary value from among a plurality of $2^M$ possible binary values to indicate both the detection result and the additional information.

Additionally, in various embodiments, the value of M may vary, and may be the same or different among different transmissions. In addition or alternatively, in various embodiments, the first node 102 may select a value of M from among a plurality of values for M. In other embodiments, the second node 104, rather than the first node 102, selects the value of M from among a plurality of values for M. For such embodiments, the second node 104 may transmit the value of M it determines or selects to the first node 102. Accordingly, the value of M that the first node 102 or the second node 104 determines or selects may be the same or different for different messages that the first node 102 generates.

Also, in some example embodiments, the value of M that the first node 102 or the second node 104 determines or selects may depend on the message types or combination of message types that the first node 102 chooses for a given transmission. For example, the first node 102 may determine a first value of M for a first transmission for which the first node 102 generates a first message according to a first set of one or more message types, and may determine a second value of M for a second transmission for which the first node 102 generates a second message according to a second set of one or more message types. The first value of M and the second value of M may the same or different from each other, depending on the one or more message types included in each of the first and second message type sets.

In addition or alternatively, the value of M that the first node 102 or the second node 104 determines or selects may depend on (or is a function of) a transmission instance number. Accordingly, the first node 102 or the second node 104 may determine a transmission instance number of the current transmission, and in turn select a value of M from among a plurality of value of M that corresponds to the determined transmission number. In particular embodiments, the first node 102 may use different values of M for different retransmissions of a given at least one transport block portion.

In addition or alternatively, the first node 102 may determine a value of M according to a signaling configuration of a given protocol layer. In various embodiments, where the message is generated according to the detection state information type, the first node 102 determines M according to a signaling configuration of a layer higher than the physical layer. In addition or alternatively, where the message is generated according to a transmission resource type, the first node 102 determines M according to a signaling configuration of the physical layer. In addition or alternatively, where the message is generated according to the channel state information type, the first node 102 determines M according to a signaling configuration of the physical layer.

Also, for at least some example embodiments, each message value (e.g., each binary value) of the plurality of message values is associated with one or more ranges, that in turn, are each associated with a respective one of the message types. For embodiments where the first node 102 determines a value (e.g., a detection state information value, a transmission resource number, a coding and modulation mode value, a channel state information value, or an error rate value) or a relative value associated with a given message type, the first node 102 may determine a range from among a plurality of ranges in which the value is in, and then determine the message value that corresponds to the determined range.

In addition or alternatively, in various embodiments, each message value of the plurality of message values is associated with one or more parameters of a given message type, such that different message values are associated with different parameters. If the first node 102 wants the second node 104 to set a certain parameter for a subsequent transmission, the first node 102 may select a message value associated with that certain parameter to include in the message. To illustrate, in an example where the first node 102 generates a message according to the coding and modulation mode type, a first message value may indicate an encoding rate and a second message value may indicate a modulation type. If the first node 102 wants the second node 104 to set the encoding rate in a subsequent transmission, then the first node 102 selects and includes the first message value in the message. If the first node 102 wants the second node 104 to set the modulation type in a subsequent transmission, then the first node selects and includes the second message value in the message.

In addition or alternatively, for at least some example embodiments, the first node 102 may select a message value from a lookup table, which the first node 102 has access to, such as by being stored in the memory 112. The following table illustrates a non-limiting example of a look-up table that the first node 102 may use to determine a message value.

TABLE 1

| Look-Up Table of Message Values | | |
|---|---|---|
| Message values (M = 3) | Detection Result | Relative value R of a given message type |
| 000 | positive acknowledgement | $R \leq r1$ |
| 001 | positive acknowledgement | $r1 < R \leq r2$ |
| 011 | positive acknowledgement | $r2 < R \leq r3$ |
| 010 | positive acknowledgement | $r3 < R$ |
| 110 | negative acknowledgement | $R \leq r4$ |
| 111 | negative acknowledgement | $r4 < R \leq r5$ |
| 101 | negative acknowledgement | $r5 < R \leq r6$ |
| 100 | negative acknowledgement | $r6 < R$ |

In the example illustrated in Table 1, M is 3, and so the first node 102 has eight possible binary message values from which to select to include in a message to send back to the second node 102. Also, as shown, each message value is associated with a detection result, including a positive acknowledgement and a negative acknowledgement, and additional information a respective one of a plurality of ranges corresponding to a relative value R of a given message type. Upon determining both the detection result (i.e., whether the first node successfully or unsuccessfully received the at least one transport block portion) and the relative value R, the first node 102 then selects the 3-bit binary value from the look-up table that is associated with both a detection result that matches the determined detection result, and that is associated with a range that the relative value R is in. The first node 102 then includes that selected 3-bit value in the message.

As mentioned, the above Table 1 merely provides a non-limiting example of a look-up table, and several other types of look-up tables may be possible, including those for an M different than (less than or greater than) 3, and/or that indicates additional information for multiple message types. In addition or alternatively, in various embodiments, the first node 102 may utilize or have access to multiple look-up tables. For example, the first node 102 may use different look-up tables for different values of M. When the first node 102 is to select a message value to include in a message, the first node 102 may determine (or have already determined) a value of M from among a plurality of possible values of M, and then use the look-up table from among the plurality of look-up tables that is associated with the determined value of M.

In addition or alternatively to using one or more look-up tables, the first node 102 may determine the value to include in the message according to an equation. Depending on the equation, the first node 102 may then convert the output or result of the equation into an M-bit binary value.

As a non-limiting example, in various embodiments where the first node 102 generates a message according to the channel state information type, the first node 102 may determine a channel state information value S, and then determine a value T based on the channel state information value S and a given value M according to the following mathematical equation:

$$T = \begin{cases} \max(\min(\lfloor S/\Delta \rfloor, 2^M - 1), 0), & \text{positive acknowledgement;} \\ 2^{M-1} + \max(\min(\lfloor S/\Delta \rfloor, 2^M - 1), 0), & \text{negative acknowledgement.} \end{cases} \quad (1)$$

where $\Delta$ is a quantization factor. Upon determining T, the first node 102 may then convert T into its M-bit binary representation.

As another non-limiting example, in various embodiments where the first node 102 generates a message according to the error rate type and that indicates a bit error rate B, the first node 102 may determine the value of the bit error rate B and then determine a value T based on the bit error rate B and a given value M according to the following mathematical equation:

$$T = \begin{cases} 0, & \text{positive acknowledgement;} \\ \max\left(\min\left(\left\lfloor \dfrac{|\log_{10}B|}{\Delta} \right\rfloor, 2^M - 1\right), 1\right), & \text{negative acknowledgement.} \end{cases} \quad (2)$$

where $\Delta$ is a quantization factor. Upon determining T, the first node 102 may then convert T into its M-bit binary representation. Equations (1) and (2) are merely examples, and other equations, including those used for message types other than the channel state information and error rate message types, may be possible.

As mentioned, the message value that the first node 102 determines may be included in the message as part of the message generation at block 304. At block 306, upon generating the message, the first node 102 may transmit the message to the second node 104.

FIG. 4 shows a flow chart of another feedback messaging method 400 for wireless communication. At block 402, the second node 104 may perform a current transmission by transmitting at least one transport block portion to the first node 102. At block 404, the second node 104 may receive a message associated with the at least one transport block from the first node 102. The message indicates both a detection result of receiving the at least one transport block portion, and additional information that indicates to the second node 104 how to set one or more parameters for a subsequent transmission to the first node 102. The additional information indicated in the message may include one or more aspects of the one or more message types according to which the first node 102 generates the message, as previously described. In particular example embodiments, the message includes a value, such as an M-bit binary value, that indicates both the detection result and the additional information.

At block 406, the second node 104 may set the one or more parameters according to the message, and/or the value included in the message. For example, the second node 104 may analyze the value, and based on the analysis of the value, determine whether to perform a re-transmission of the at least one transport block portion, and/or how to set one or more parameters for a subsequent transmission, non-limiting examples of which include a transmit beam, a transmit power, one or more transmission resources, or one or more parameters of a coding and modulation mode. At block 408, the second node may perform the subsequent transmission by transmitting a second at least one transport block portion according to the setting performed at block 406. As described, the subsequent transmission may be a re-transmission of the at least one transport block portion transmitted at block 402, or a transmission of a new or different at least one transport block portion.

As mentioned, by indicating the additional information, in addition to the detection result, in the feedback message that the first node 102 sends to the second node 102, and in turn by the second node 104 setting one or more parameter(s) for a subsequent, transmission reliability and efficiency in wireless systems may be improved.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
receiving, with a first node, at least one portion of a first transport block from a second node; and
transmitting, with the first node, a message to the second node, the message comprising a value that indicates both a detection result of receiving the at least one portion of the first transport block, and additional information indicating to the second node how to set one or more parameters for a subsequent transmission to the first node,
wherein the detection result indicates acknowledgement information regarding receipt of the at least one portion by the first node, wherein the value comprises an M-bit binary value where M is selected from among a plurality of values for M by the first node or the second node, wherein each of the plurality of values of M corresponds to a respective one of a plurality of message type sets, wherein each of the plurality of message type sets comprises at least one of a plurality of message types comprising a detection state information type, a transmission resource type, or an error rate type, and wherein each of the plurality of message type sets comprises a different one or a different combination of two or more of the plurality of message types from other of the plurality of message type sets; and
receiving, with the first node, at least one portion of a second transport block of the subsequent transmission that is transmitted according to a setting of the one or more parameters performed by the second node for the subsequent transmission.

2. A method of wireless communication, comprising:
transmitting, with a second node, at least one portion of a first transport block to a first node;
receiving, with the second node, a message from the first node, the message comprising a value that indicates both a detection result of receiving the at least one portion of the first transport block, and additional information indicating to the second node how to set one or more parameters for a subsequent transmission to the first node, wherein the detection result indicates acknowledgement information regarding receipt of the at least one portion by the first node, wherein the value comprises an M-bit binary value where M is selected from among a plurality of values for M by the first node or the second node, and wherein each of the plurality of values of M corresponds to a respective one of a plurality of message type sets, wherein each of the plurality of message type sets comprises at least one of a plurality of message types comprising a detection state information type, a transmission resource type, or an error rate type, and wherein each of the plurality of message type sets comprises a different one or a different combination of two or more of the plurality of message types from other of the plurality of message type sets;
setting, with the second node, the one or more parameters based on the value in the message; and
transmitting, with the second node, at least one portion of a second transport block of the subsequent transmission to the first node according to the setting.

3. The method of claim 2, wherein the at least one portion of the first transport block and the at least one portion of the second transport block are a same at least one portion of a same transport block.

4. The method of claim 2, wherein the at least one portion of the first transport block and the at least one portion of the second transport block are different portions of a same transport block.

5. The method of claim 2, wherein the first transport block and the second transport block are different transport blocks.

6. The method of claim 2, wherein the additional information comprises a detection state information value of the at least one portion of the first transport block.

7. The method of claim 2, wherein the additional information comprises a relative value between a detection state information value of the at least one portion of the first transport block and an associated reference value.

8. The method of claim 7, wherein the one or more parameters comprises one or more transmission resources for the subsequent transmission, and wherein the relative value indicates, to the second node, to increase or decrease one or more amounts of the one or more transmission resources for the subsequent transmission.

9. The method of claim 2, wherein the additional information comprises a relative value between a first detection state information value of the at least one portion of the first transport block and a second detection state information value of a prior transmission.

10. The method of claim 6, wherein the detection state information value depends on at least one of: one or more receive powers of the at least one portion of the first transport block, one or more input signal-to-noise ratios of a multiple antenna detector of the first node, one or more output signal-to-noise ratios of the multiple antenna detector, at least one output signal statistic of the multiple antenna detector, at least one input signal statistic of the multiple antenna detector, one or more input signal-to-noise ratios of a demodulator of the first node, one or more output signal-to-noise ratios of the demodulator, at least one output signal statistic of the demodulator, at least one input signal statistic of the demodulator, one or more input signal-to-noise ratios of a decoder of the first node, one or more output signal-to-noise ratios of the decoder, at least one output signal statistic of the decoder, or at least one input signal statistic of the decoder.

11. The method of claim 10, wherein the detection state information value depends on: the at least one output signal statistic of the multiple antenna detector, the at least one input signal statistic of the multiple antenna detector, the at least one output signal statistic of the demodulator, the at least one input signal statistic of the demodulator, the at least one output signal statistic of the decoder and the at least one input signal statistic of the decoder, and wherein each of the at least one input signal statistic and the at least one output signal statistic of each of the multiple antenna detector, the demodulator, and the decoder comprises at least one of a respective a mean, a variance, a second-order moment, or at least one moment higher than the second-order moment.

12. The method of claim 2, wherein the additional information comprises a transmission resource number.

13. The method of claim 2, wherein the additional information comprises a relative value between a first transmission resource number for the subsequent transmission and a second transmission resource number of the at least one portion of the first transport block.

14. The method of claim 2, wherein the additional information comprises a relative value between a first transmission resource number of the at least one portion of the first transport block and a second transmission resource number for a prior transmission.

15. The method of claim 2, wherein the additional information comprises a relative value between a first transmission resource number for the subsequent transmission and a second transmission resource number of an earliest transmission of the at least one portion of the first transport block.

16. The method of claim 12, wherein the transmission resource number depends on at least one of: a transmission bandwidth, a transmission duration, a number of resource blocks, a number of subcarriers, a number of resource elements, a number of modulation symbols, or a number of output bits of an encoder of the second node.

17. The method of claim 2, wherein the additional information comprises an error rate of the at least one portion of the first transport block.

18. The method of claim 17, wherein the error rate comprises at least one of a bit error rate or a transport block portion error rate.

19. The method of claim 18, wherein the transport block portion error rate comprises a code block error rate.

20. A wireless communications apparatus comprising:
a memory storing a plurality of instructions; and a processor configured to execute the plurality of instructions, and upon execution of the plurality of instructions, is configured to:
transmit at least one portion of a first transport block to a first node;
receive a message from the first node, the message comprising a value that indicates both a detection result of receiving the at least one portion of the first transport block, and additional information indicating to the wireless communications apparatus how to set one or more parameters for a subsequent transmission to the first node, wherein the detection result indicates acknowledgement information regarding receipt of the at least one portion by the first node, wherein the value comprises an M-bit binary value where M is selected from among a plurality of values for M by the first node or the wireless communications apparatus, and wherein each of the plurality of values of M corresponds to a respective one of a plurality of message type sets, wherein each of the plurality of message type sets comprises at least one of a plurality of message types comprising a detection state information type, a transmission resource type, or an error rate type, and wherein each of the plurality of message type sets comprises a different one or a different combination of two or more of the plurality of message types from other of the plurality of message type sets;
set the one or more parameters based on the value in the message; and
transmit at least one portion of a second transport block of the subsequent transmission to the first node according to the setting.

* * * * *